United States Patent

[11] 3,607,970

| [72] | Inventor | William B. Borst, Jr.<br>Mt. Prospect, Ill. |
|---|---|---|
| [21] | Appl. No. | 819,295 |
| [22] | Filed | Apr. 25, 1969 |
| [45] | Patented | Sept. 21, 1971 |
| [73] | Assignee | Universal Oil Products Company<br>Des Plaines, Ill. |

[54] PROCESS FOR PRODUCING HIGH OCTANE ALKYLATED HYDROCARBONS SUBSTANTIALLY FREE OF ALKYL FLUORIDE COMPOUNDS
9 Claims, 1 Drawing Fig.

[52] U.S. Cl. .................................................. 260/683.48, 260/683.42
[51] Int. Cl. .................................................. C07c 3/54
[50] Field of Search .................................. 260/683.48, 683.41, 683.42

[56] References Cited
UNITED STATES PATENTS

| 2,426,841 | 9/1947 | Peavy et al. | 260/683.41 |
| 2,468,756 | 5/1949 | Iverson | 260/683.41 |
| 3,171,865 | 3/1965 | Davison et al. | 260/683.48 |
| 3,206,524 | 9/1965 | Plaster | 260/683.48 |
| 3,254,137 | 5/1966 | Hutto et al. | 260/683.48 |

*Primary Examiner*—Delbert E. Gantz
*Assistant Examiner*—G. J. Crasanakis
*Attorneys*—James R. Hoatson, Jr. and Philip T. Liggett

ABSTRACT: Process for producing high-octane alkylated hydrocarbons substantially free of alkyl fluoride compounds utilizing a hydrogen fluoride alkylation catalyst and a reactor system comprising a reaction cooler and a reaction soaker and a settler-contactor wherein the reactor soaker effluent is separated in the settler-contactor into a catalyst fraction and a fraction comprising high-octane alkylated hydrocarbons, unreacted hydrocarbons and alkyl fluoride compounds, the latter friction being contacted with concentrated hydrogen fluoride in the settler-contactor so that the alkyl fluoride compounds are reacted with the concentrated hydrogen fluoride.

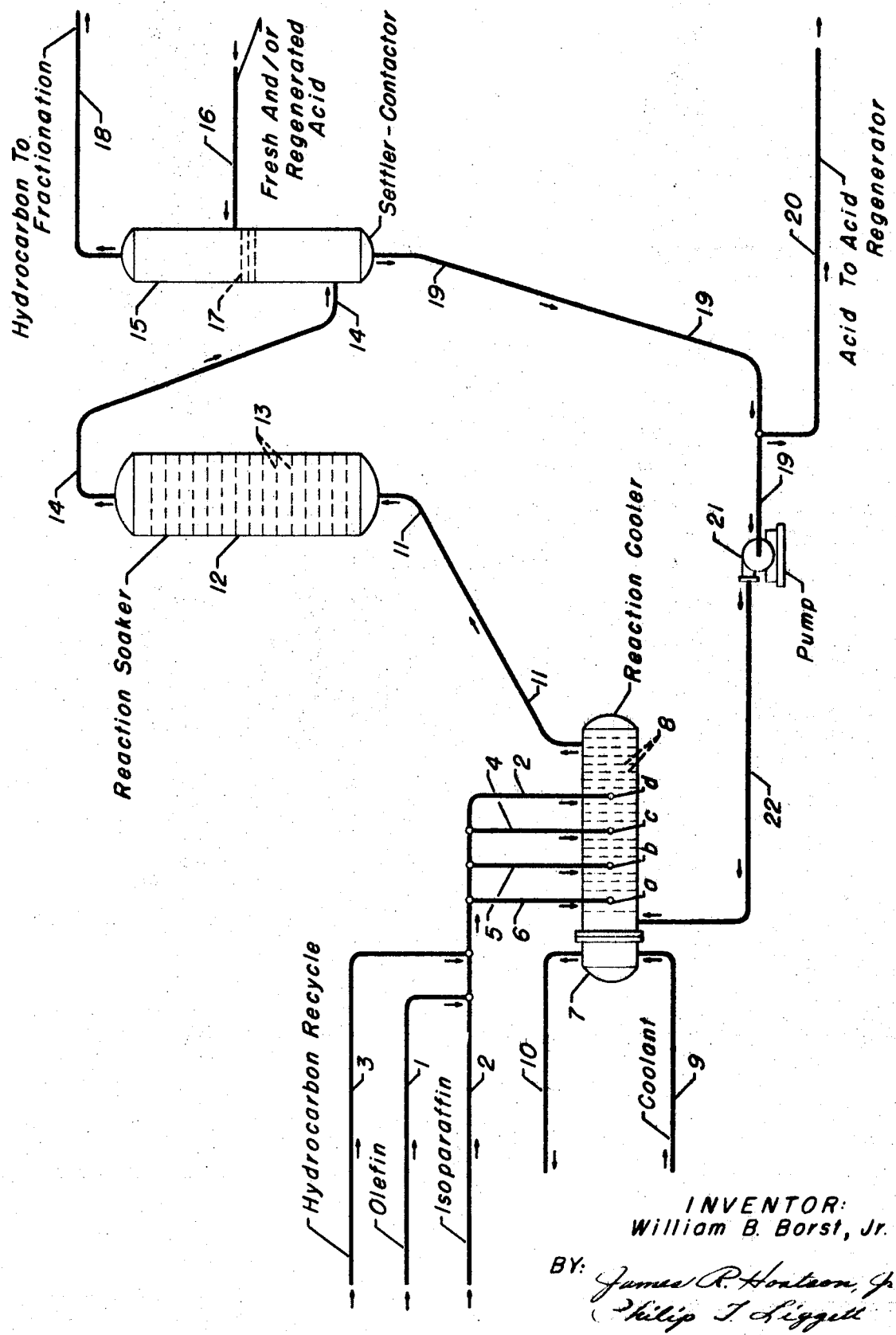

PROCESS FOR PRODUCING HIGH OCTANE ALKYLATED HYDROCARBONS SUBSTANTIALLY FREE OF ALKYL FLUORIDE COMPOUNDS

BACKGROUND OF THE INVENTION

This invention relates to a process for producing high-octane alkylated hydrocarbons substantially free of alkyl fluoride compounds. It particularly relates to a process for alkylating an isoparaffin hydrocarbon with an olefin hydrocarbon. This invention specifically relates to the isothermal alkylation of an isoparaffin with an olefin utilizing a hydrogen fluoride alkylation catalyst in a reactor system comprising a reaction cooler, a reaction soaker and a settler-contactor.

Production of higher molecular weight isoparaffinic hydrocarbons having valuable antiknock properties and suitable for use in automotive and aviation fuels is of considerable importance to the petroleum-refining industry. Furthermore, the introduction of automotive engines of relatively high compression ratio has necessitated the utilization of high antiknock fuels in these engines to obtain maximum efficiency therefrom. Thus, the demand for higher and higher octane number fuels has led to increased use of higher molecular weight isoparaffinic hydrocarbons as blending agents in gasolines.

A convenient source of such higher molecular weight isoparaffinic hydrocarbons is found in the catalytic alkylation of relatively low-boiling isoparaffinic hydrocarbons such as, for example, isobutane, with relatively low-boiling olefinic hydrocarbons such as, for example, propylene, butylene, amylenes and mixtures thereof.

It is well known in the prior art that catalytic alkylation using, for example, hydrogen fluoride as the catalyst has become an important process for preparing alkylated compounds and derivatives thereof.

Generally, the prior art processes for accomplishing the alkylation reaction included the contacting of an isoparaffinic hydrocarbon feed with an olefinic hydrocarbon in the presence of hydrogen fluoride alkylation catalyst in reaction vessel suitable for conducting such a reaction. The difficulty in achieving a process embodying all of the desirable features of a completely optimum reaction is complicated by the fact that the alkylation reaction, if not carried out properly, may initiate side reactions such as polymerization which destroy the effectiveness of the alkylation reaction by inhibiting the production of maximum quantities of the desired high octane hydrocarbons which make up the alkylate product. One major contributor to the undesired polymerization reaction is elevated temperature and, in addition, alkyl fluoride compound formation is also favored at elevated temperatures and thus is an undesired product of the alkylation reaction. Since the alkylation reaction is exothermic in nature, the release of the heat of reaction requires careful control of the temperature within the reactor system to prevent the polymerization reaction and the formation of alkyl fluoride compounds from taking place.

SUMMARY OF THE INVENTION

Accordingly, it is an object of this invention to provide a process for producing high-octane alkylated hydrocarbons substantially free of alkyl fluoride compounds.

It is another object of this invention to provide a process for producing high-octane alkylated hydrocarbons substantially free of alkyl fluoride compounds in a more facile and economical manner.

Therefore, the present invention provides a process for producing high-octane alkylated hydrocarbons substantially free of alkyl fluoride compounds which comprises the steps of:
(a) introducing an isoparaffin-olefin admixture into a cooling section of an elongated reaction cooler having a predetermined number of baffle means to furnish a pressure drop of from about 5 to about 25 p.s.i. in order to maintain a homogeneous reaction mass through said cooler; (b) contacting said admixture with hydrogen fluoride alkylation catalyst in a cooling-mixing section of said reaction cooler; (c) continuously removing heat of reaction from said reaction cooler using internally placed heat exchange means and turbulence derived therefrom to maintain regulated isothermal reaction conditions in said reaction cooler; (d) passing a reaction cooler effluent comprising catalyst, alkylated hydrocarbons, unreacted hydrocarbons and alkyl fluoride compounds to a reaction soaker having a predetermined number of soaker means to furnish a pressure drop of from 5 to about 25 p.s.i. in order to maintain a homogeneous reaction mass through said soaker zone; (e) further reacting in said reaction soaker said catalyst, alkylated hydrocarbons and unreacted hydrocarbons; (f) withdrawing from said reaction soaker for passage to a settler-contactor zone a reaction soaker effluent comprising high-octane alkylated hydrocarbons, catalyst, unreacted hydrocarbons and alkyl fluoride compounds; (g) separating in a lower portion of said settler-contactor zone hydrogen fluoride catalyst from high-octane alkylated hydrocarbons, unreacted hydrocarbons and alkyl fluoride compounds; (h) contacting in an intermediate portion of said settler-contactor said high-octane alkylated hydrocarbons, unreacted hydrocarbons and alkyl fluoride compounds with concentrated hydrogen fluoride under conditions sufficient to react the alkyl fluoride compounds with said concentrated hydrogen fluoride; (i) further separating in an upper portion of said settler-contactor said hydrogen fluoride of step (h) from said high-octane alkylated hydrocarbons and from said unreacted hydrocarbons; (j) withdrawing and passing at least a portion of said hydrogen fluoride of step (g) and said hydrogen fluoride of step (i) from a bottom portion of said settler-contactor zone into said reaction cooler without intervening cooling thereof and passing the remainder of said hydrogen fluoride into an acid regeneration zone; and, (k) removing as overhead from said settler-contactor high-octane alkylated hydrocarbons and unreacted hydrocarbons substantially free of alkyl fluoride compounds for further separation and recovery in a fractionation zone.

As will be described hereinafter in greater detail, the essence of my invention encompasses the integrated and interdependent concept of utilizing an alkylation reaction system comprising a reaction cooler, a reaction soaker and a settler-contactor. In conjunction with this concept is the requirement for a predetermined and preset geometry of the reaction cooler so that a pressure drop of from 5 to about 25 p.s.i. to maintain a homogeneous reaction mass through the cooler can be obtained. In addition, the reaction soaker is designed with an internally preset geometry so that a pressure drop of from 5 to about 25 p.s.i. to maintain a homogeneous reaction mass can also be obtained through the reaction soaker. Further, my system embodies the introduction of premixed isoparaffin and olefinic hydrocarbons into a cooling section of my reaction cooler and the contacting of this admixture with hydrogen fluoride catalyst that is first distributed in my reaction cooler by means of an acid distributor baffle. Further, the isoparaffin-olefin admixture contacts the hydrogen fluoride catalyst in a cooling-mixing section of the cooler. In this manner of operation, complete alkylation as well as transalkylation of the hydrocarbon reactants is achieved and a high-quality octane number alkylate having a minimum of alkyl fluoride compounds contained therein may be obtained from the combination of the reaction cooler and the reaction soaker so that substantially complete elimination of the alkyl fluoride compounds may be achieved in my settler-contactor.

My invention can be most clearly described and illustrated with reference to the attached drawing which is a schematic representation of a specific embodiment of my invention.

DESCRIPTION OF THE DRAWING

Referring now to the drawing, olefin hydrocarbon via line 1 is premixed in isoparaffin supply line 2 to form an isoparaffin-olefin admixture. Although my process is particularly applicable to the alkylation of isobutane with a butylene-containing feed stock, the process is also applicable to other isoparaffinic hydrocarbons and other olefin hydrocarbon feedstocks to produce motor fuel or aviation alkylates or higher boiling aliphatic alkylated compounds. Thus, the isoparaffin hydrocarbon to be alkylated may comprise isobutane, isopentane, one or more of the isohexanes, mixtures of the aforementioned isoparaffins, as well as the branched chain heptanes and other aliphatic hydrocarbons of branched type and chain structure. My process may also be utilized for the alkylation of aromatic hydrocarbons such as benzene to make detergent type products. The olefinic hydrocarbon utilized as the alkylating agent in my invention comprises olefinic hydrocarbons such as propylene, 1-butene, 2-butene, isobutylene, the isomeric amylenes, the hexenes, the heptenes and higher molecular weight olefinic hydrocarbons. The isoparaffin-olefin admixture is passed via line 2 into a cooling section of an elongated reaction cooler having a predetermined number of baffle means to furnish a pressure drop of from about 5 to about 25 p.s.i. in order to maintain a homogeneous reaction mass through the cooler. The isoparaffin-olefin admixture passes via lines 2, 4, 5 and 6, in a preferred embodiment, through inlet loci $a$, $b$, $c$ and $d$ of reaction cooler 7. Inlet loci $a$, $b$, $c$ and $d$ may be, for example, spray nozzles and the like.

In a preferred embodiment, the baffle means (numeral 8) are standard exchanger-type baffles and, for example, may be preset in such a manner that a pressure drop of from about 5 to about 25 p.s.i. (to maintain a homogeneous reaction mass) through the cooler is achieved. I prefer at least one baffle, utilized as an acid distribution baffle before inlet $a$. I further prefer that there be at least three baffles between inlets $a$ and $b$, inlets $b$ and $c$, and inlets $c$ and $d$. Further, I prefer that at least six baffles be utilized after inlet $d$ in my reaction cooler. By utilizing this arrangement, a pressure drop of between 10 and 15 p.s.i. through the reaction cooler can be achieved.

As described above with reference to my preferred embodiment, the purpose of a plurality of inlet loci is to inject the feed mixture into a cooling section of the reaction cooler through the catalyst phase already present in reaction cooler 7 in such a manner that the evolved heat of reaction may be removed almost immediately by heat exchange means (not shown) using coolant, such as relatively cold water, flowing through the eat exchange means via line 9 and 10. Typically, the heat exchange means is a conventional heat exchanger using tubes for the passage of the coolant with the reaction taking place on the shell side of the heat exchanger. By operating in this manner, the alkylation reaction takes place in the immediate vicinity of the heat removal means so that regulated isothermal conditions are maintained in reaction cooler 7.

As set forth hereinabove, the feed admixture is contacted with hydrogen fluoride alkylation catalyst in a cooling-mixing section of the reaction cooler. The term "hydrogen fluoride" alkylation catalyst as used herein is intended to include catalyst wherein hydrogen fluoride is the essential active ingredient. Thus, it is within the scope of this term to use substantially anhydrous hydrogen fluoride containing various additives or promoters such as boron trifluoride. Ordinarily, commercially available anhydrous hydrogen fluoride will be charged to the alkylation system as fresh catalyst. It is, however, possible to use hydrogen fluoride containing as much as about 2.5 percent water by weight.

As previously noted, the heat of reaction is removed continuously from the reaction cooler using internally placed heat exchange means and turbulence is derived therefrom such that regulated isothermal reaction conditions are maintained in the reaction cooler. The reaction conditions in the reaction cooler include an isoparaffin-olefin mole ratio of from about 1:1 to 20:1 and preferably from 3:1 to 15:1. The alkylation reaction occurs at temperatures from 0° F. to about 200° F. and preferably from 30° F. to 110° F. The pressure on the alkylation system is maintained so as to keep the reactants and catalyst in liquid phase; that is, from about atmospheric pressure to about 40 atmospheres or more and typically in the range of from about 200 p.s.i.g. to about 300 p.s.i.g. It is an essential element in the practice of this invention that the reaction cooler be designed so that a pressure drop of from about 5 to 25 p.s.i. and preferably from about 10 to 20 p.s.i. is built into the reaction cooler to provide turbulent and homogeneous mixing inside the reaction cooler. The contact time in the alkylation reaction cooler is typically less than 5 minutes, and preferably less than 2 minutes, for example, 10 to 60 seconds. The alkylation reaction is conducted in the presence of hydrogen fluoride catalyst in an amount so as to produce a catalyst-to-hydrocarbon volume ratio of 0.5 to 2.5.

The reaction cooler effluent comprising catalyst, alkylated hydrocarbons, alkyl fluoride compounds and unreacted hydrocarbons including isoparaffinic hydrocarbons and a minor amount of olefinic hydrocarbons is passed via line 11 to reaction soaker 12 containing a predetermined number of soaker means which usually are perforated plates or decks, (represented by numeral 13) in the soaker vessel. The reaction soaker design is set so that a pressure drop of from about 5 to about 25 p.s.i. and preferably from 10 to 20 p.s.i. is maintained through the reaction soaker to maintain a homogeneous composition. The purpose of the reaction soaker is to build as much time as needed into the alkylation reaction so that complete reaction can occur. The effluent charged to the soaker passes upwardly into the soaker means and the alkylated hydrocarbons and unreacted hydrocarbons continue to react in this vessel for a predetermined time. It is believed that in addition to the alkylation reaction taking place in the reaction soaker, transalkylation of low-octane alkylated hydrocarbons occurs with the result that high-quality high-octane alkylated hydrocarbons are obtained as the product of the transalkylation reaction in the soaker vessel. The reaction cooler effluent passing through the reaction soaker is maintained in the reaction soaker for a time depending on the composition of the particular type of effluent charged to the vessel. A reaction soaker residence time of from about 100 seconds to about 1,200 seconds is preferred.

A reaction soaker effluent comprising high-octane alkylated hydrocarbons, catalyst, unreacted hydrocarbons (usually isoparaffins) and alkyl fluoride is withdrawn and passed from reaction soaker 12 via line 14 to settler-contactor zone 15 wherein hydrogen fluoride catalyst is separated in the lower portion of the settler-contactor from the high octane alkylated hydrocarbons, unreacted hydrocarbons and alkyl fluoride compounds.

In an intermediate portion of settler-contactor 15 the high octane alkylated hydrocarbons, unreacted hydrocarbons and alkyl fluoride compounds are contacted with concentrated hydrogen fluoride having a concentration of at least 95 percent by weight by means of contacting trays. Fresh and/or regenerated hydrogen fluoride having a concentration of at least 95 percent by weight may be utilized.

The alkyl fluoride compounds are reacted with the concentrated hydrogen fluoride so that less than 50 p.p.m. (weight) of alkyl fluorides, and preferably below 20 p.p.m. (weight) of alkyl fluorides is present in the finished high-octane alkylated hydrocarbon product. In an upper portion of settler-contactor 15, the hydrogen fluoride utilized to react with the alkyl fluoride compounds is separated from the high-octane alkylated hydrocarbons and from the unreacted hydrocarbons passed upwardly through this vessel. All of the hydrogen fluoride present in settler-contactor 15 including the hydrogen fluoride catalyst utilized in the reaction cooler and reaction soaker as well as the concentrated hydrogen fluoride utilized to remove the alkyl fluoride is withdrawn via line 19 from a bottom portion of settler-contactor 15. A portion of this hydrogen fluoride in line 19 is passed to reaction cooler 7 via pump 21 and lines 19 and 22 without intervening cooling and the remainder of this hydrogen fluoride is passed via lines 19 and 30 to acid regenerator means (not shown) for regeneration of the hydrogen fluoride alkylation catalyst. The high-octane alkylated hydrocarbons and unreacted hydrocarbons substantially free of alkyl fluoride compounds are removed as overhead from settler-contactor 15 via line 18 for further separation and recovery in a fractionation zone (not shown).

In a preferred embodiment, at least a portion of the unreacted hydrocarbons may be recycled to the reaction cooler via lines 2, 3, 4, 5 and 6 in admixture with the isoparaffin-olefin admixture passing to a cooling section of the reaction cooler.

PREFERRED EMBODIMENT

In a particularly preferred embodiment of my invention, this invention provides a process for producing high-octane alkylated hydrocarbons substantially free of alkyl fluoride compounds which comprises the steps of: (a) introducing an isoparaffin-olefin admixture into a cooling section of an elongated reaction cooler having a predetermined number of baffle means to furnish a pressure drop of from about 5 to about 25 p.s.i. in order to maintain a homogeneous reaction mass through said cooler; (b) contacting said admixture with hydrogen fluoride alkylation catalyst in a cooling-mixing section of said reaction cooler; (c) continuously removing heat of reaction from said reaction cooler using internally placed heat exchange means and turbulence derived therefrom to maintain regulated isothermal reaction conditions in said reaction cooler; (d) passing a reaction cooler effluent comprising catalyst, alkylated hydrocarbons, unreacted hydrocarbons and alkyl fluoride compounds to a reaction soaker having a predetermined number of soaker means to furnish a pressure drop of from 5 to about 25 p.s.i. in order to maintain a homogeneous reaction mass through said soaker zone; (e) further reacting in said reaction soaker said catalyst, alkylated hydrocarbons and unreacted hydrocarbons; (f) withdrawing from said reaction soaker for passage to a settler-contactor zone a reactor soaker effluent comprising high-octane alkylated hydrocarbons, catalyst, unreacted hydrocarbons and alkyl fluoride compounds; (g) separating in a lower portion of said settler-contactor zone hydrogen fluoride catalyst from high-octane alkylated hydrocarbons, unreacted hydrocarbons and alkyl fluoride compounds; (h) contacting in an intermediate portion of said settler-contactor said high-octane alkylated hydrocarbons, unreacted hydrocarbons and alkyl fluoride compounds with concentrated hydrogen fluoride under conditions sufficient to react the alkyl fluoride compounds with said concentrated hydrogen fluoride; (i) further separating in an upper portion of said settler-contactor said hydrogen fluoride of step (h) from said high-octane alkylated hydrocarbons and from said unreacted hydrocarbons; (j) withdrawing and passing at least a portion of said hydrogen fluoride of step (g) and said hydrogen fluoride of step (i) from a bottom portion of said settler-contactor zone into said reaction cooler without intervening cooling thereof and passing the remainder of said hydrogen fluoride into an acid regeneration zone; (k) removing as overhead from said settler-contactor high-octane alkylated hydrocarbons and unreacted hydrocarbons substantially free of alkyl fluoride compounds for further separation and recovery in a fractionation zone; and, (l) recycling the unreacted hydrocarbons of step (k) to said reaction cooler in admixture with the isoparaffin-olefin mixture of step (a).

It is apparent that the present invention provides a process for producing high-octane alkylated hydrocarbons substantially free of alkyl fluoride compounds in a most economical and efficient manner.

I claim as my invention:

1. A process for producing high-octane alkylated hydrocarbons substantially free of alkyl fluoride compounds which comprises the steps of:

a. introducing an isoparaffin-olefin admixture into an elongated reaction cooler, said reaction cooler having internally placed heat exchange means and having a predetermined number of spaced baffle means to furnish a pressure drop of from about 5 to about 25 p.s.i. in order to maintain a homogeneous reaction mass through said cooler;

b. contacting said admixture with hydrogen fluoride alkylation catalyst in said reaction cooler;

c. continuously removing heat of reaction from said reaction cooler using said internally placed heat exchange means and turbulence derived therefrom to maintain regulated isothermal reaction conditions in said reaction cooler;

d. passing a reaction cooler effluent comprising said catalyst, alkylated hydrocarbons, unreacted hydrocarbons and alkyl fluoride compounds to a reaction soaker having a predetermined number of spaced perforated plates therein to furnish a pressure drop of from about 5 to about 25 p.s.i. in order to maintain a homogeneous reaction mass through said soaker;

e. maintaining said effluent in said reaction soaker for a time sufficient to complete the alkylation reaction;

f. passing from said reaction soaker to a settler-contactor zone a reaction soaker effluent comprising high-octane alkylated hydrocarbons, said catalyst, unreacted hydrocarbons and alkyl fluoride compounds;

g. separating in a lower portion of said settler-contactor zone hydrogen fluoride catalyst from high-octane alkylated hydrocarbons, unreacted hydrocarbons and alkyl fluoride compounds;

h. contacting in an intermediate portion of said settler-contactor said high-octane alkylated hydrocarbons, unreacted hydrocarbons and alkyl fluoride compounds with concentrated hydrogen fluoride under conditions sufficient to react the alkyl fluoride compounds with said concentrated hydrogen fluoride;

i. further separating in an upper portion of said settler-contactor said hydrogen fluoride of step (h) from said high-octane alkylated hydrocarbons and from said unreacted hydrocarbons;

j. withdrawing and passing a portion of said hydrogen fluoride of step (g) and said hydrogen fluoride of step (i) from a bottom portion of said settler-contactor zone into said reaction cooler without intervening cooling thereof and passing the remaining portion of said hydrogen fluoride into an acid regeneration zone; and, k. removing as overhead from said settler-contactor said high-octane alkylated hydrocarbons and unreacted hydrocarbons substantially free of alkyl fluoride compounds for further separation and recovery in a fractionation zone.

2. This process according to claim 1 wherein said isoparaffin-olefin admixture is formed from isobutane and an olefin having from 3 to 5 carbon atoms per molecule.

3. The process according to claim 1 wherein said isoparaffin-olefin admixture is formed from isobutane and butylene.

4. The process according to claim 1 wherein said isoparaffin-olefin admixture is passed into said reaction cooler through a plurality of inlet loci comprising from two to six inlet points longitudinally spaced intermediate the ends of said reaction cooler.

5. The process according to claim 1 wherein at least a portion of the unreacted hydrocarbons of step (k) is recycled to the reaction cooler.

6. The process according to claim 1 wherein at least a portion of the catalyst of step (h) after passing into said acid regeneration zone is recycled to the settler-contactor.

7. The process according to claim 1 wherein said catalyst is recycled to the settler-contactor in admixture with fresh hydrogen fluoride catalyst.

8. A process for producing high-octane alkylated hydrocarbons substantially free of alkyl fluoride compounds which comprise the steps of:

a. introducing an isoparaffin-olefin admixture into an elongated reaction cooler, said reaction cooler having internally placed heat exchange means and having a predetermined number of spaced baffle means to furnish a pressure drop of from 5 to about 25 p.s.i. in order to maintain a homogenous reaction mass through said cooler;

b. contacting said admixture with hydrogen fluoride alkylation catalyst in said reaction cooler;

c. continuously removing heat of reaction from said reaction cooler using said internally placed heat exchange means and turbulence derived therefrom to maintain regulated isothermal reaction conditions in said reaction cooler;

d. passing a reaction cooler effluent comprising said catalyst alkylated hydrocarbons, unreacted hydrocarbons and alkyl fluoride compounds to a reaction soaker having a predetermined number of spaced perforated plates therein to furnish a pressure drop of from 5 to about 25 p.s.i. in order to maintain a homogeneous reaction mass through said soaker zone;

e. maintaining said effluent in said reaction soaker for a time sufficient to complete the alkylation reaction;

f. passing from said reaction soaker to a settler-contactor zone a reactor soaker effluent comprising high octane alkylated hydrocarbons, said catalyst, unreacted hydrocarbons and alkyl fluoride compounds;

g. separating in a lower portion of said settler-contactor zone said hydrogen fluoride catalyst from high-octane alkylated hydrocarbons, unreacted hydrocarbons and alkyl fluoride compounds;

h. contacting in an intermediate portion of said settler-contactor said high-octane alkylated hydrocarbons, unreacted hydrocarbons and alkyl fluoride compounds with concentrated hydrogen fluoride under conditions sufficient to react the alkyl fluoride compounds with said concentrated hydrogen fluoride;

i. further separating in an upper portion of said settler-contactor said hydrogen fluoride of step (h) from said high-octane alkylated hydrocarbons and from said unreacted hydrocarbons;

j. withdrawing and passing a portion of said hydrogen fluoride of step (g) and said hydrogen fluoride of step (i) from a bottom portion of said settler-contactor zone into said reaction cooler without intervening cooling thereof and passing the remaining portion of said hydrogen fluoride into an acid regeneration zone;

k. removing as overhead from said settler-contactor said high-octane alkylated hydrocarbons and unreacted hydrocarbons substantially free of alkyl fluoride compounds for further separation and recovery in a fractionation zone; and, l. recycling the unreacted hydrocarbons of step (k) to said reaction cooler in admixture with the isoparaffin-olefin admixture of step (a).

9. The process according to claim 8 wherein said concentrated hydrogen fluoride has a concentration of at least 95 percent by weight hydrogen fluoride.

UNITED STATES PATENT OFFICE
CERTIFICATE OF CORRECTION

Patent No. 3,607,970        Dated September 21, 1971

Inventor(s) William B. Borst, Jr.

It is certified that error appears in the above-identified patent and that said Letters Patent are hereby corrected as shown below:

On the cover sheet insert -- The portion of the term of the patent subsequent to February 2, 1988, has been disclaimed. --.

Signed and sealed this 12th day of September 1972.

(SEAL)
Attest:

EDWARD M. FLETCHER, JR.          ROBERT GOTTSCHALK
Attesting Officer                Commissioner of Patents